March 25, 1941.     H. M. BIEBEL     2,236,394
TIMER CONTROL MEANS
Filed Oct. 18, 1939     2 Sheets-Sheet 1
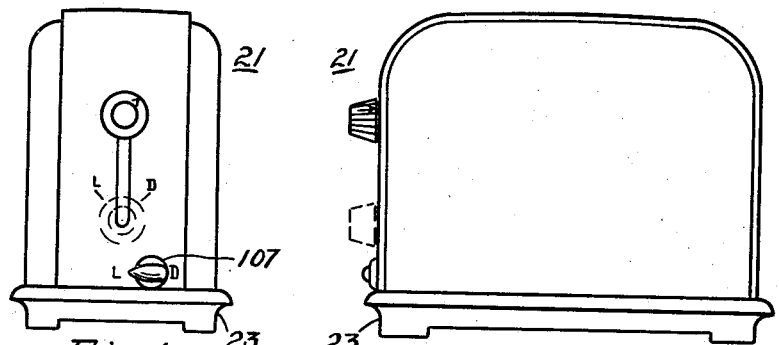
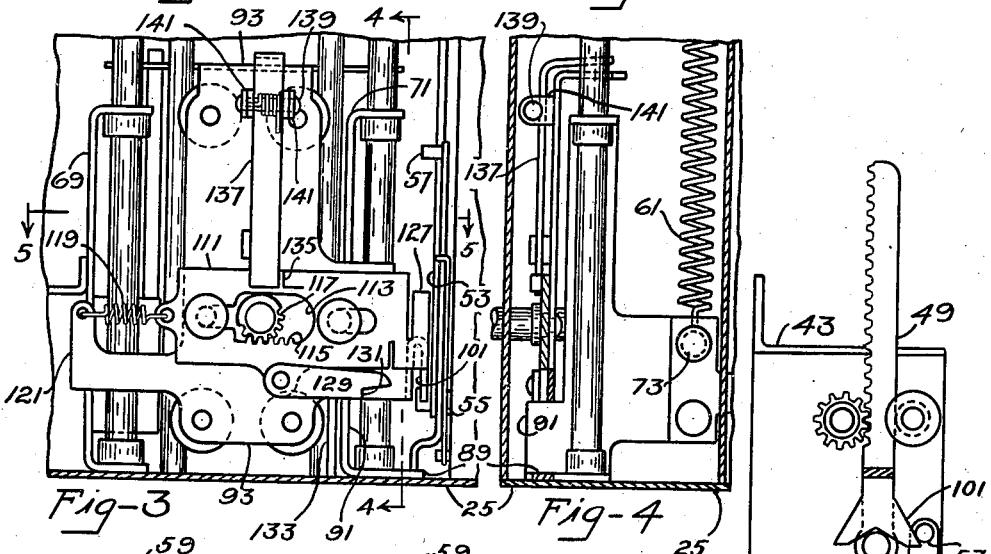
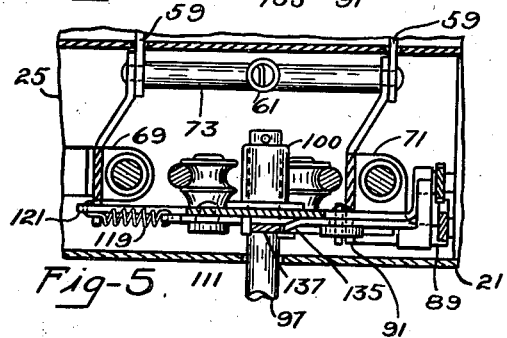
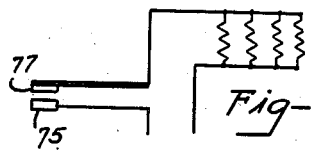
INVENTOR
HERMAN M. BIEBEL
BY
H. M. Biebel
ATTORNEY March 25, 1941.   H. M. BIEBEL   2,236,394
TIMER CONTROL MEANS
Filed Oct. 18, 1939   2 Sheets-Sheet 2
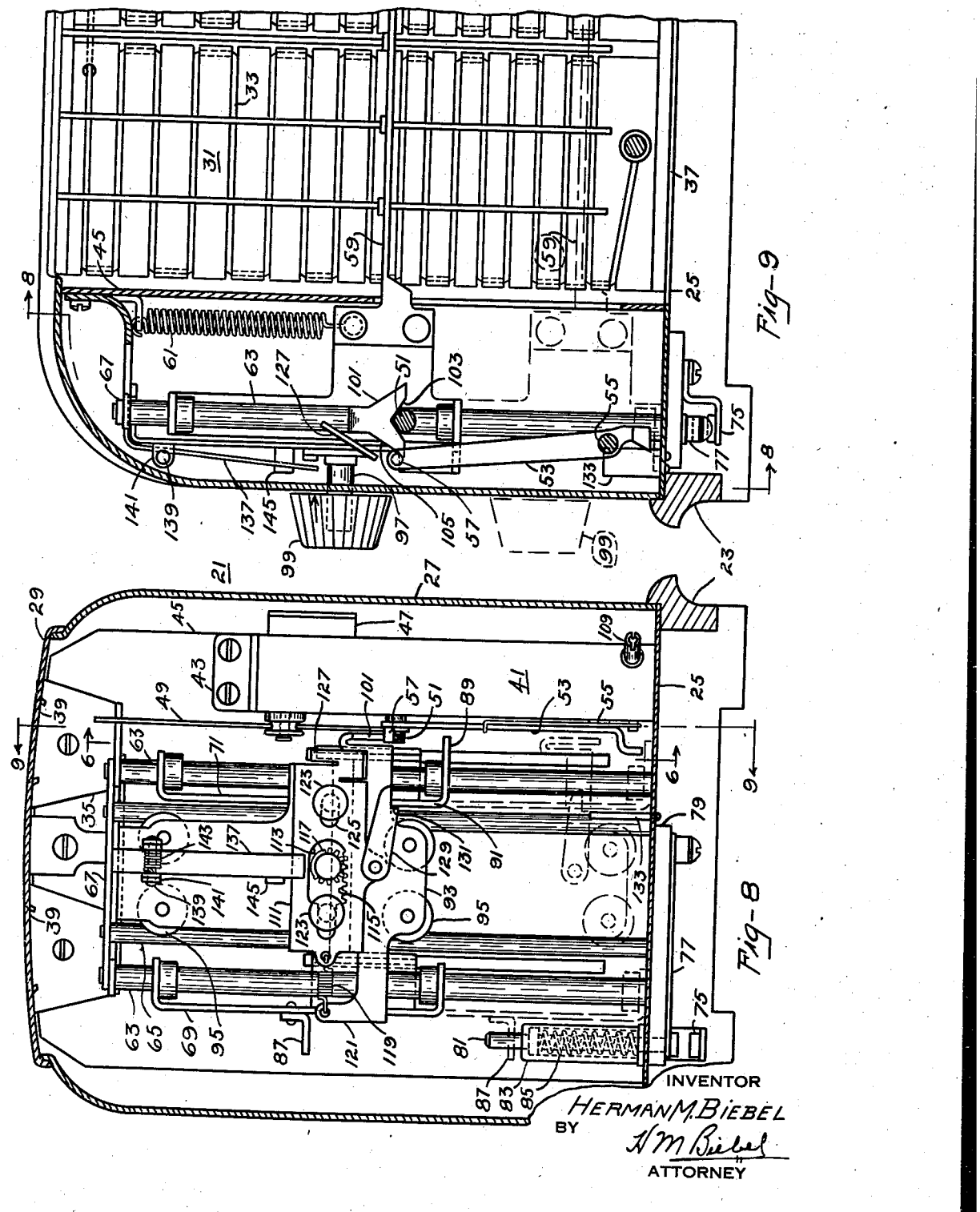
INVENTOR
Herman M. Biebel
BY
H. M. Biebel
ATTORNEY Patented Mar. 25, 1941

2,236,394

UNITED STATES PATENT OFFICE 2,236,394

TIMER CONTROL MEANS

Herman M. Biebel, Elgin, Ill., assignor to McGraw Electric Company, Elgin, Ill., a corporation of Delaware Application October 18, 1939, Serial No. 299,940

10 Claims. (Cl. 161—16)

My invention relates to cooking devices and particularly to time controlled electric toasters.

The main object of my invention is to provide relatively simple means controllable by an operator for varying the duration of the toasting operation.

Another object of my invention is to provide means controllable by an operator after initiation of a toasting operation for shortening the duration of a toasting operation.

Another object of my invention is to provide means controllable by an operator after initiation of a toasting operation for shortening the duration of a toasting operation, said means being rendered ineffective after the termination of a toasting operation.

Other objects of my invention will either be specifically pointed out hereinafter, particularly in the appended claims, or will be evident from the description of one form of device now preferred by me.

In the drawings:

Figure 1 is a front elevational view, on a reduced scale, of a toaster embodying my invention, Fig. 2 is a side elevational view on a reduced scale, of the toaster shown in Fig. 1, Fig. 3 is a vertical lateral sectional view showing particularly the parts embodying my invention, these parts being shown in the positions they occupy after the initiation of a toasting operation, Fig. 4 is a fragmentary side elevational view taken on the line 4—4 of Fig. 3, Fig. 5 is a fragmentary horizontal sectional view taken on the line 5—5 of Fig. 3, Fig. 6 is a view in side elevation of a mechanical timer, taken on the line 6—6 of Fig. 8 and showing particularly certain elements of the timer, Fig. 7 is a diagram of the electric circuit for the toaster, Fig. 8 is a front elevational view through a toaster embodying my invention taken on the line 8—8 of Fig. 9 and showing certain parts of the toaster in inoperative position, and Fig. 9 is a fragmentary side elevational view taken on the line 9—9 of Fig. 8.

An automatic electric toaster designated generally by the numeral 21 includes a skeleton base frame 23 which may be made of moulded composition material and a bottom plate 25 made of relatively thin sheet metal and secured in any suitable or desired manner against a recessed upper surface of the skeleton frame 23. The toaster includes also a casing 27 including front, rear and side walls, which casing may be made of thin sheet metal and be open at the top and at the bottom. The casing 27 may be secured, by any suitable means now well known in the art and not shown in the drawings, adjacent to the upper surface of plate 25. The toaster casing is provided with a cover 29 which is held against the upper edge of the casing 27 in any suitable or desired manner, not shown in the drawings, since these details constitute no part of my invention.

I have elected to illustrate my device as applied to a standard two-slice toaster now being manufactured and sold and a toaster of this kind is provided with a pair of spaced vertically extending planar heating elements 31 of the general kind shown in Ireland Patent No. 2,001,362 and the toaster 21 will therefore include four spaced-apart vertically-extending planar heating elements, each including thin sheets of electric insulating material such as mica and a resistor 33 carried by the plates. The bottom edges of the respective planar resistors may have interfitting engagement, in well known manner, with the plate 25 and their upper edges may be held in proper lateral adjustment by one or more top frame plates 35 (see Fig. 8), all in a manner well known in the art.

The base plate 25 is provided with longitudinally extending openings 37 therein, the number of such openings being equal to that of the number of slices of bread adapted to be simultaneously toasted in the toaster and the cover 29 is also provided with openings 39, equal in number to the slices of bread which may be simultaneously toasted in a toaster, to permit of inserting these slices of bread and of removing the slices of toast. The top frame plates 35 will also be individually provided with bread-inserting and bread-removing openings registering with the openings 39.

The device embodying my invention is particularly applicable to an automatic electric toaster including a mechanical timing means, which timing means is designated by the numeral 41 and which mechanical timer may be of the type disclosed and claimed in Ireland Patent No. 1,866,808. Reference may be had to this last mentioned patent for details as to the construction of the timer. The timer rests upon the base plate 25 and is held in its proper operative position thereon by a bracket 43, which bracket may be secured to a front intermediate wall 45 constituting a part of the toaster.

The timer includes a spring shown at 47 in Figs. 6 and 8 of the drawings and a rack bar 49 having a lug 51 extending laterally therefrom near its lower end for a purpose to be hereinafter referred to. The timer includes also a detent 53 in the shape of a double arm lever mounted pivotally on a pin 55 intermediate the ends of the detent. The upper end of detent 53 is provided with a lateral lug 57 having a purpose to be hereinafter referred to.

The toaster includes further a bread carrier structure including one or more bread carriers 59, which bread carriers are normally yieldingly biased to the upper full line position shown in Fig. 9 of the drawings by a spring 61. This upper position is what may be called the non-toasting position and in order to initiate a toasting operation the bread carriers will be moved downwardly into toasting position substantially as shown by the broken lines in Fig. 9 of the drawings.

Means for permitting movement of the bread carrier or carriers into toasting position may include a pair of outer vertically extending standards 63 and a pair of inner standards 65. The lower ends of these standards or rods may interfit with the base plate 25 while the upper ends thereof may be held in proper operative position by the top frame plates 35 and a cross bar 67. A pair of sliders 69 and 71 have reciprocal vertical movement on the pair of outer standards 63. These sliders are mechanically connected together by a cross bar 73 (see Fig. 5) which serves at the same time to secure the front end portions of carriers 59 to rearwardly extending portions of the sliders 69 and 71. It may be here pointed out that the upper end of the biasing spring 61 is connected to one of the top frame plates 35 or to a member supported thereby and extending therebetween in case of a two-slice toaster, while the lower end of the coil spring 61 may be connected to the cross rod 73 intermediate its ends, as shown in Fig. 5 of the drawings.

Switch means for controlling the energization of the electric heaters may include a substantially fixed contact 75 located below the base plate 25 and suitably insulated therefrom and a movable contact arm 77 insulatedly mounted as, for instance, on a block 79 of electric-insulating material supported against the bottom of base plate 25. An actuating rod 81 is positioned in a tubular housing 83 located above the base plate 25, a coil spring 85 within the housing 83 being so arranged as to normally yieldingly bias actuating rod 81 upwardly into the position shown in Fig. 8 of the drawings, at which time contacts 75 and 77 will be out of engagement with each other and the electric heaters will therefore be deenergized.

Means for causing engagement of the two contact members when the bread carriers have been moved into toasting position may include a bracket lug 87 secured to slider 69 in such a manner that when the bread carriers and sliders 69 and 71 are moved downwardly in a manner to be hereinafter described, lug 87 will engage the upper end of rod 81 and move it downwardly until the two contacts are in engagement.

Slider 71 is provided with an extension 89 of substantially L-shape at its lower end, the outer end of the horizontal portion of member 89 being so positioned that it may engage with and under the lower end of detent lever 53 so that the bread carriers and the sliders will be held in lowered position for a predetermined length of time, until released by the timer in a manner to be hereinafter described. The member 89 includes also a vertically extending portion 91 which is of such width that it will project forwardly under a carriage 93 which is of substantially rectangular plate form. The carriage 93 is provided with an upper and a lower pair of rollers 95, which rollers fit against the inner pair of vertical standards 65 so that the carriage may be moved vertically on the standards. The carriage plate 93 is provided with a forwardly extending stub shaft 97 secured to the carriage plate, the shaft 97 extending outwardly through a slot in the front wall of the casing 27 and having a knob 99 fixedly secured thereon. The shaft 97 has turning movement relatively to the carriage 93 in a bearing 100 secured to the carriage for a purpose to be hereinafter set forth.

The carriage 93 is provided at its right-hand side with a combined timer-winding and detent-tripping member 101, the general shape of portion 101 being shown in Fig. 9 of the drawings as having a V-shaped recess 103 in its bottom edge. The lug 51 on the rack bar 49 is adapted to be engaged in the recess 103 when the carriage 93 is moved downwardly by an operator pressing on the knob 99, starting with the bread carriers in their uppermost or non-toasting position, to wind or condition the spring 47 of the timer 41.

To initiate a toasting operation with the parts shown in substantially the positions indicated in Fig. 8, the operator presses downwardly on knob 99, whereby the bread carriers are moved into their lower or toasting position, the mechanical timer 41 is conditioned for operation by winding up the spring 47 by downward movement of the rack bar 49 and at the same time, and particularly toward the end of the downward movement of the carriage, the heater control switch is closed. Since the portion 91 of slider 71 extends under a part of the carriage 93, it is obvious that the sliders and the bread carrier will be moved downwardly with the carriage. It is only necessary for the operator to move the carriage and the sliders downwardly far enough to cause the horizontal portion of member 89 to move under the detent lever 53 when it will be in the position shown in Fig. 3 of the drawings to move the carriers into toasting position, the detent lever acting upon member 89 to hold the bread carriers in their lowermost or toasting position.

The mechanical timer was wound to a predetermined condition by the downward movement of the timer winding member 101 and will then immediately begin to operate or run down or unwind, which will cause a slow upward movement of the carriage since lug 51 on the rack bar 49 fits into recess 103. The upper surface of member 101 includes at least one cam surface 105 which is adapted to engage lug 57 on the detent lever when the carriage and member 101 have been moved upwardly a sufficient distance, which is shown particularly in Fig. 9 of the drawings. The engagement of surface 105 with lug 57 causes a turning movement of the detent lever 53 which results in releasing member 89 so that the tensioned spring 61 may cause quick upward movement of the bread carriers and simultaneous opening of the heater control switch.

The design, construction and adjustment of the parts thus far described and constituting the sliders, the carriage and the timer-winding and detent-releasing means is such that the timer is what may be called fully wound by the lowering of the carriers from non-toasting into toasting position and the length of time required for the unwinding of the timer to cause a release movement of the detent lever to occur is a predetermined length of time.

I have shown in Figs. 1, 2, 6 and 8 of the drawings that the mechanical timer 41 is provided with an adjusting knob 107 mounted on a shaft 109 to permit of adjusting the speed of the timer disclosed and claimed in the hereinbefore mentioned Ireland Patent No. 1,866,808 which, as there disclosed, is a variable speed timer. I do not, however, desire to limit my invention to a variable speed mechanical timer since I may use a constant speed timer instead of a variable speed timer although I naturally prefer to use a variable speed timer or rather an adjustable timer since it permits of obtaining different durations of toasting operations with uniform or full winding of the timer. When I call for or refer to a timer in the claims, I desire it to be understood that either a constant speed mechanical timer or a variable speed mechanical timer having means for adjusting the speed is intended to be covered and I include also the case where a variable speed timer is provided with a thermo-bar subject to toaster temperature for varying the speed of the variable speed timer in accordance with the temperature of the toaster. A toaster of this general kind is disclosed and claimed in Graham Patent No. 2,138,674 assigned to the same company as is the present application.

As has already been set forth hereinbefore in connection with certain parts of the toaster, all of the above described details are old and well known in the art and the parts more particularly constituting my invention will now be described.

It may be possible that one user of a toaster of this kind may desire his bread toasted to a given degree, say to medium or to dark. As is well known, the adjusting knob 107 permits not only of different users obtaining different degrees of toasting of similar slices of bread to suit their own personal requirements or desires but this adjusting knob permits also of compensating for variations in the voltage in the supply circuit to which toasters of this general type may be connected.

My invention provides means for reducing the length of time of a toasting operation so that when desired by a second operator or user wishing to produce less toasted bread, a very simple manipulation will obtain this result. A small plate 111 is movably mounted on carriage 93 and has an elongated opening 113 at substantially the mid-central portion thereof, the lower wall of this opening being provided with teeth 115. A pinion 117 is fixedly mounted on shaft 97, the teeth of which mesh with the teeth 115. The plate 111 is normally yieldingly biased into a given position as by a tension spring 119, one end of which is connected to the left-hand end of plate 111 while the other end is connected to an extension 121 on carriage 93. The plate 111 is held against the front surface of carriage 93 by a pair of headed rivets 123, the plate 111 being provided with elongated slots 125 receiving the body of the rivets 123.

In the right-hand end of plate 111 there is provided a detent trip member 127 which is generally in the form of a small angularly extending plate portion which may be integral with plate 111. Member 127 is positioned at a given distance above cam surface 105.

It will be noted that normally the plate 111 and member 127 are biased to respectively the left-hand position and to inoperative or ineffective position, that is, one where member 127 will not engage pin 57 on the detent lever when the carriage is moved upwardly by the timer after initiation of a toasting operation.

I provide also means for locking the plate 111 in its left-hand position so that the detent trip member will be ineffective, by a pivotally mounted arm 129 on the plate 111 and having a shoulder 131 near its right-hand or free end. Normally this shoulder will rest upon the upper edge of portion 91 of member 89. It is thus evident that should the operator attempt to turn the knob 99 in a counter-clockwise direction when the bread carrier is in non-toasting position, he will be prevented from doing so by engagement of shoulder 131 against portion 91 of the slider 71.

I provide means for causing the holding means 129 to be moved out of its locking position, this means including a small vertical bar 133, the height of which is such that when the sliders and the carriage have been moved into their lowermost position, the upper end of the bar 33 will engage and cause a small amount of counter-clockwise turning of arm 129. It is therefore possible for an operator to move the auxiliary or second detent trip member only after the initiation of a toasting operation, that is, when the bread carrier has been moved into toasting position, the carrier return spring 61 has been conditioned for operation, the timer has been wound and the control switch has been closed.

To hold plate 111 in its moved position where member 127 is located to engage pin 57 after a certain length of time of operation of the timer 41, I provide a forwardly extending projection or lug 135 at the top edge of plate 111, which projection may be integral with the plate and bent out therefrom in a forwardly direction. A holding or locking means includes a bar 137 of substantially L-shape, which bar is pivotally mounted adjacent its upper end on a pivot pin 139 supported by a pair of brackets 141 secured to or integral with carriage 93. The holding arm 137 is normally held in a position where its lower end engages the lug 135, by a spring 143 surrounding the pivot pin 139. The upper horizontally bent end portion of holding bar 137 is so positioned that upon termination of a toasting operation and full upward movement of the carriage 93 it will engage cross bar 67 and thereby cause a small amount of clockwise turning movement when seen from its right-hand side, as shown in Fig. 9 of the drawings. Means for preventing tilting movement of arm 137 on its pivotal support may include a lug 145 which may be secured to or integral with the carriage 93 and which engages the left-hand side or edge of arm 137.

Let it be assumed that an operator desires to toast one or more slices of bread to a lesser degree than provided for by the setting of adjusting knob 107 and the use of the main trip member 101. He would then proceed as follows: Push downwardly on the knob 99 to the full extent thereby fully winding the timer, closing the switch and causing interlocking engagement of the lower end of detent lever 53 and of member 89 of the slider 71. The arm 129 would then occupy the position shown in Fig. 3, so that plate 111 could be moved to the right. He would then turn the knob in a counter-clockwise direction so that plate 111 would move from the position shown in Fig. 8 of the drawings toward the right to a position shown in Fig. 3 of the drawings, whereby the auxiliary detent trip member 127 would be moved into operative or effective position relatively to the detent. As is obvious, the second or auxiliary detent trip member is positioned ahead of the main trip member 101 and particularly the surface 105 so that member 127 will engage lug 57 in a time less than the predetermined time required by cam surface 105 to engage the lug or pin 57 to cause termination of a toasting operation.

The holding arm 137 will be engaged by projection 135 so that during the running-down period of the timer or during the duration of a toasting operation, plate 111 and trip membber 127 will be in the positions shown in Fig. 3. Shortly after the detent lever 53 has been released by the auxiliary trip member 127 the upper horizontally extending part of holding arm 137 will engage the lower surface of cross bar 67 and will be forced from the position shown in Fig. 4 of the drawings to the position shown in Fig. 9 of the drawings, that is, its lower end will be moved out of holding engagement with projection 135 so that spring 119 can move plate 111 to the left so that the auxiliary detent trip member will be moved again into its normal ineffective position.

It is, therefore, obvious that the device particularly embodying my invention provides a relatively simple manually-operable means for permitting a user of a toaster embodying my invention to obtain a lighter degree of toasting of a slice or slices of bread should he so desire. I wish to point out here that it is not necessary for the operator or user of the toaster to select any one of a number of different members in accordance with the degree of toasting desired but that all that is necessary is to grasp the actuating knob, move it downwardly without turning if a certain degree of toasting is desired, or to move it down and then turn it slightly if a lesser degree of toasting is desired.

I wish to point out also that the device embodying my invention is useful in case it is found that a toaster embodying my invention is connected to a source of supply of excessively high voltage, which would, with the normal setting of the toaster control, result in dark or even burnt toast. All that is necessary when this condition is found to be present is for the user to initiate a toasting operation by pressing on and moving downwardly the actuating knob and when it has been moved downwardly to its limit, to turn the knob slightly in the manner hereinbefore described. It may also be pointed out that the auxiliary detent-tripping means is held in ineffective position until after the initiation of a toasting operation and if used, is moved into ineffective position immediately after the termination of a toasting operation. If, therefore, the adjusting knob 107 is moved, say to the position indicated by "D" in Fig. 1 of the drawings to obtain dark toast, a toaster provided with the device embodying my invention will give or provide such toast if desired by the operator but is ready to give or provide toast of lighter color if desired by another operator.

While I have illustrated and described a control switch for the toasting heater which fully interrupts the energization of the toast heater, it is obvious that my invention is not limited thereto and I desire to have it understood that the use of a switch which will merely properly reduce the degree of energization of the toast heater at the termination of a toasting operation may also be used with my invention.

I desire to point out further that I have illustrated and described a preferred embodiment of my invention as applied to a specific toaster but it is obvious that my invention may be embodied in other forms and applied to other kinds and types of toasters and cooking devices and I therefore desire that the appended claims be construed to cover all obvious variations and modifications of my invention.

I claim as my invention:

1. In an automatic electric toaster comprising toast heating elements, a bread carrier movable into toasting and non-toasting positions relatively to the toast heating elements and normally yieldingly biased into non-toasting position, a mechanical timer, a carriage operatively connected with the carrier, a knob rotatably mounted on the carriage and effective to cause movement of the carriage and of the carrier in one direction into toasting position, a detent for holding the carrier in toasting position, a timer-winding and detent-trip member fixedly mounted on the carriage effective when the carrier is moved into toasting position to condition the timer for operation, said timer then operating to cause return movement of the carriage and the timer-winding and detent-trip member to cause the latter to engage and effect release movement of the detent a predetermined length of time after starting to operate, the improvement comprising a second detent-trip member movably mounted on said carriage normally biased out of alinement with said fixedly mounted detent-trip member, means operable by the knob only when said carriage has been moved a given distance in said one direction to move said second trip-member into alinement with said fixedly mounted trip member to cause timer-effected return movement of the second trip member to effect release movement of said detent in a shorter length of time than said predetermined length of time and means to hold said second detent-trip member in said alined position.

2. In an automatic electric toaster comprising toast heating elements, a bread carrier movable into toasting and non-toasting positions relatively to the toast heating elements and normally yieldingly biased into non-toasting position, a mechanical timer, a carriage operatively connected with the carrier, a knob rotatably mounted on the carriage and effective to cause movement of the carriage and of the carrier in one direction into toasting position, a detent for holding the carrier in toasting position, a timer-winding and detent-trip member fixedly mounted on the carriage effective when the carrier is moved into toasting position to condition the timer for operation, said timer then operating to cause return movement of the carriage and the timer-winding and detent-trip member to cause the latter to engage and effect release movement of the detent a predetermined length of time after starting to operate, the improvement comprising a second detent-trip member movably mounted on said carriage normally biased out of alinement with said fixedly mounted detent-trip member, means operable by the knob only when said carriage has been moved a given distance in said one direction to move said second trip-member into alinement with said fixedly mounted trip member to cause timer-effected return movement of the second trip member to effect release movement of said detent in a shorter length of time than said predetermined length of time, means to hold said second detent-trip member in said alined position and means for causing releasing movement of the holding means for said second detent trip member at the end of the return movement of said carriage.

3. In an automatic electric toaster comprising toast heating elements, a control switch therefor normally yieldingly biased to open position, a mechanical timer, a carriage movable in one direction to cause closing of said control switch, a carriage-actuating knob rotatably mounted on said carriage and effective to cause movement of the carriage in said one direction and closure of said switch, a detent for holding said switch closed, a timer-winding and detent-trip member fixedly mounted on the carriage effective when the carriage is moved in said one direction and said control switch is closed to condition the timer for operation, said timer then operating to cause return movement of the carriage and the timer-winding and detent-trip member to cause the latter to engage and effect release movement of the detent a predetermined length of time after starting to operate, the improvement comprising a second detent-trip member movably mounted on said carriage normally biased out of alinement with said fixedly mounted detent-trip member, means operable by the knob only when said carriage has been moved a given distance in said one direction to move said second trip-member into alinement with said fixedly mounted trip member to cause timer-effected return movement of the second trip member to effect release movement of said detent in a shorter length of time than said predetermined length of time and means to hold said second detent-trip member in said alined position.

4. In an automatic electric toaster comprising toast heating elements, a bread carrier movable into toasting and non-toasting positions relatively to the toast heating elements and normally yieldingly biased into non-toasting position, a mechanical timer, a carriage operatively connected with the carrier, a knob rotatably mounted on the carriage and effective to cause movement of the carriage and of the carrier in one direction into toasting position, a detent for holding the carrier in toasting position, a timer-winding and detent-trip member fixedly mounted on the carriage effective when the carrier is moved into toasting position to condition the timer for operation, said timer then operating to cause return movement of the carriage and the timer-winding and detent-trip member to cause the latter to engage and effect release movement of the detent a predetermined length of time after starting to operate, the improvement comprising a second detent-trip member movably mounted on said carriage normally biased out of alinement with said fixedly mounted detent-trip member, means operable by the knob only when said carriage has been moved to bring the bread carrier into substantially toasting position to move said second trip-member into alinement with said fixedly mounted trip member to cause timer-effected return movement of the second trip member to effect release movement of said detent in a shorter length of time than said predetermined length of time and means to hold said second detent-trip member in said alined position.

5. In a cooking device comprising a heating means, means for initiating a cooking operation, a mechanical timer, and means to condition the timer simultaneously with the initiation of a cooking operation and actuable by the operating timer to effect termination of a cooking operation after a predetermined length of time, the improvement comprising a second operation-terminating means normally yieldingly biased out of alinement with said first named operation-terminating means, manually operable means for moving said second operation-terminating means into alinement with said first named operation-terminating means to cause said second terminating means to cause termination of a cooking operation in less than said predetermined length of time, means to hold said second terminating means in said alined position and means for causing release movement of said holding means on termination of a cooking operation.

6. In a cooking device comprising electric heating means, a food support movable into operative and non-operative positions relatively to the electric heating means and normally yieldingly biased into non-operative position, means to move the food support into operative position, a detent for holding the food support in operative position, a mechanical timer, a detent-trip member movable by the operating timer to engage said detent and cause it to release said food support after a predetermined length of time of operation of the timer, the improvement comprising a second detent-trip member operatively supported by said first named detent-trip member and normally yieldingly biased out of alinement with said first named detent-trip member, manual means operatively supported by said first named detent-trip member for moving said second detent-trip member relatively to said first detent-trip member into alinement with and leading said first detent-trip member to cause said second detent-trip member to actuate the detent to release said food support in a shorter than said predetermined length of time required by said first detent-trip member.

7. In an electric cooking device comprising electric heating means, means for initiating an operation of the cooking device, a mechanical timer and means to condition the timer for operation at the initiation of a cooking operation, said timer-conditioning means being thereafter actuated by the timer to effect terminatiton of a cooking operation after a predetermined length of time, the improvement comprising a second operation-terminating means operatively supported by said timer-conditioning and operation-terminating means and having two opposed positions relatively thereto, means normally biasing and locking said second operation-terminating means in position out of alinement with said first named terminating means, means effective only at substantially the end of the initiation of an operation for releasing said locking means from its locking position, manually-actuable means operatively supported by said first named terminating means for moving said second terminating means into alinement with said first named terminating means when said locking means has been moved out of locking position and means to lock said second terminating means in said latter postion until the termination of a cooking operation.

8. In an electric cooking device comprising electric heating means, means including a manually-actuable knob for initiating a cooking operation, a mechanical timer, means movable by said knob to condition the timer for operation at the initiation of a cooking operation and thereafter movable by said timer to effect termination of a cooking operation after a predetermined length of time, the improvement comprising a second operation-terminating means operatively supported by said first named operation-terminating means and having two opposed positions relatively thereto, means normally biasing and locking said second operation-terminating means out of alinement with said first named operation-terminating means, means to engage said locking means at substantially the end of the initiation of a cooking operation to render it ineffective, means connecting said manually-actuable knob and said second operation-terminating means to cause turning movement of the knob when said locking means has been rendered ineffective to move said second operation-terminating means into alinement with said first named operation-terminating means to cause it to terminate a cooking operation in less than said predetermined time, means to hold said second operation-terminating means in said alined position and means to release said means holding said second operation-terminating means in alined position at the end of a cooking operation.

9. In an automatic electric toaster comprising toast heating elements, a bread carrier movable into toasting and non-toasting positions relatively to the toast heating elements and normally yieldingly biased into non-toasting position, a mechanical timer, a carriage operatively connected with the carrier, a knob rotatably mounted on the carriage and effective to cause movement of the carriage and of the carrier in one direction into toasting position, a detent for holding the carrier in toasting position, a timer-winding and detent-trip member fixedly mounted on the carriage effective when the carrier is moved into toasting position to condition the timer for operation, said timer then operating to cause return movement of the carriage and the timer-winding and detent-trip member to cause the latter to engage and effect release movement of the detent a predetermined length of time after starting to opertae, the improvement comprising a second detent-trip member movably mounted on said carriage normally biased out of alinement with said fixedly mounted detent-trip member, a locking member on said second detent-trip member to normally lock it out of alinement with said first detent-trip member, means engaging said locking member when the bread carrier is in toasting position to move it out of locking position, means connecting the knob and the second detent-trip member to cause turning movement of the knob by an operator after the bread carrier is in toasting position to move said second detent-trip member into alinement with said first named detent-trip member to cause it to engage said detent and effect carrier-release movement thereof in less than said predetermined length of time, means to hold said second detent-trip member in said alined position during the return movement of the carriage and the first and second detent trip members and means to cause release of the means holding the second detent-trip member in alined position at the end of the said return movement thereof.

10. In an automatic electric toaster comprising toast heating elements, a control switch therefor normally yieldingly biased into open position, a mechanical timer, a carriage movable in one direction to cause closing of said control switch, a carriage-actuating knob rotatably mounted on the carriage to cause movement thereof in said one direction and closure of the switch, a detent for holding said switch closed, a timer-winding and detent-trip member fixedly mounted on the carriage to condition said timer coincident with closure of the switch, said timer then operating to cause return movement of the carriage and of the detent-trip member to cause the latter to engage and effect release movement of the detent a predetermined length of time after the timer starts to operate, the improvement comprising a second detent-trip member movably supported on said carriage means normally biasing and locking said second detent-trip member out of alinement with said first named detent-trip member, means effective when the carriage has been moved in said one direction to cause closure of said switch to release said locking means, turning movement of said knob then causing movement of the second detent-trip member into alinement with and ahead of said first named detent-trip member whereby to cause said second detent-trip member to engage and cause tripping of said detent sooner than it would have been engaged and tripped by said first named detent-trip member, means to hold said second detent-trip member in said alined position and means to cause release of the means holding said second detent-trip member in said alined position at the end of said return movement of the carriage and detent-trip members.

HERMAN M. BIEBEL.